US 7,826,906 B2

(12) United States Patent
Gough et al.

(10) Patent No.: US 7,826,906 B2
(45) Date of Patent: Nov. 2, 2010

(54) TRANSDUCER ACCESS POINT (75) Inventors: Chris Gough, Portland, OR (US);
Devon M. Welles, Hillsboro, OR (US);
William C. Deleeuw, Portland, OR (US); Nandakishore Kushalnagar, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 131 days.

(21) Appl. No.: 11/590,926

(22) Filed: Nov. 1, 2006

(65) Prior Publication Data
US 2008/0103608 A1 May 1, 2008

(51) Int. Cl.
G05B 11/01 (2006.01)
G05B 13/00 (2006.01)
G06F 15/16 (2006.01)

(52) U.S. Cl. ............... 700/19; 700/9; 700/10; 700/275; 709/200; 709/220; 709/224; 709/230; 709/237

(58) Field of Classification Search ............... 700/1, 700/2, 3, 9, 10, 19, 275–277, 282, 284, 286; 719/311, 317–324, 310; 718/1, 100; 705/15; 709/200, 208, 220–222, 224, 230–232, 236, 709/237; 315/297, 307, 308, 321
See application file for complete search history.

(56) References Cited

U.S. PATENT DOCUMENTS

| 5,838,226 | A  | * | 11/1998 | Houggy et al. | 340/310.11 |
| 6,587,739 | B1 | * | 7/2003  | Abrams et al. | 700/83 |
| 7,016,948 | B1 | * | 3/2006  | Yildiz        | 709/221 |
| 2002/0022991 | A1 | * | 2/2002 | Sharood et al. | 705/14 |
| 2003/0005099 | A1 | * | 1/2003 | Sven et al.    | 709/223 |
| 2005/0010655 | A1 | * | 1/2005 | Edwards et al. | 709/223 |

OTHER PUBLICATIONS

John Mark, et al., "Standard for Smart Transducers", IEEE 1451.4, pp. 1-13, Jun. 9, 2004.

* cited by examiner

*Primary Examiner*—Sean P Shechtman
(74) *Attorney, Agent, or Firm*—Pillsbury Winthrop Shaw Pittman LLP (57) ABSTRACT The invention relates to a method and apparatus for exposing (i.e. bridging) data and services offered by low power, low duty cycle transducers (e.g. sensors and actuators) in a standardized format over existing and established home networking technologies. A transducer access point is a functional component that serves as a proxy for health devices and sensors that are off/asleep the majority of the time to conserver power (e.g. battery life). The transducer access point may be implemented as a stand alone device or embedded within a computing device such as a home PC.

19 Claims, 9 Drawing Sheets

TRANSDUCER ACCESS POINT

FIELD OF INVENTION

The invention relates to a method and apparatus for bridging data and services offered by low-power, low duty-cycle transducers, such as sensors and actuators over a network.

BACKGROUND

Currently, many elder adults rely on a variety of low-tech methods to remember important events such as handwritten messages posted throughout the home. Concerned family members must visit/phone frequently to gather this type of information which is problematic for the elder adult (they don't want to be a burden on their family members) as well as the family caregiver (feelings of guilt for not calling/visiting often enough).

Personal health has been targeted as one of the major growth areas for the foreseeable future. Elder care is likely to be one of the primary (future) use cases in this area. A remote prompting infrastructure interoperable with a wide variety of devices that can inform elder adults and remote caregivers of critical/non-critical health events is going to be a key building block that will enable elder care related solutions in the home.

Currently there is no advertising tied into the prompting systems out there. By associating a relevant ad with a specific prompt to each individual user, the effectiveness of the ads is increased. Also, since the ad is tied to a prompt that the user needs to see, then the ad will be seen too.

There are ads that are associated with gross classifications like television audience, and there are targeted ads that are associated with finer classifications like web-browsing choices, but neither of these are delivered in conjunction with a prompt that the user needs to comprehend and respond to, nor do they guarantee that the user will see them.

DETAILED DESCRIPTION

The embodiment of the invention relates to a method for bridging data and services in a network, comprising discovering at least one transducer device in the network; creating a virtual transducer device for each at least one transducer device discovered; and controlling the at least one transducer device via a transducer access device. Preferably, the at least one transducer device is turned on: connecting to the transducer access device; identifying the at least one transducer device using respective technology protocols; and recognizing the at least one transducer device. Preferably, controlling includes subscribing to receive event notifications from the at least one transducer device discovered by the transducer access device; determining activities occurring on the network as a result of an event on the at least one transducer device; and initiating an action based on the determined activities. Preferably, the transducer access device sends advertisements with device descriptions to a control device; responds to search requests from the control point searching for the at least one transducer device on the network; and maintains a status of the at least one transducer device. Preferably, the at least on transducer device is a low-power and low duty-cycle device. Preferably, the transducer access device is part of the at least one transducer device. Preferably, the at least one transducer device is one of a blood pressure monitor, scale, sensor and bed. Preferably, the control device is at least one of a personal computer, television, mobile device and mirror.

In another embodiment of the invention, there is a network for bridging data and services, comprising at least one transducer device accessible via the network; a transducer access device configured to discover the at least one transducer device, and create a virtual transducer device for each at least one transducer device discovered; and a control device to control of the at least one transducer device via the transducer access device. Preferably, the at least on transducer device is a low-power and low duty-cycle device. Preferably, the transducer access device is part of the at least one transducer device. Preferably, the at least one transducer device is one of a blood pressure monitor, scale, sensor and bed. Preferably, the control device is at least one of a personal computer, television, mobile device and mirror. Preferably, the control device subscribes to receive event notifications from the at least one transducer device discovered by the transducer access device; determines activities occurring on the network as a result of an event on the at least one transducer device; and initiates an action based on the determined activities. Preferably, the transducer access device sends out device advertisements, responds to searches by the control device and maintains a state of the at least one transducer device.

The invention also related to a transducer access device method, comprising discovering at least one transducer device in a network; and creating a virtual transducer device for each at least one transducer device discovered on the network. Preferably, the invention also relates to sending advertisements with device descriptions to a control device; responding to search requests from the control point searching for the at least one transducer device on the network; and maintaining a status of the at least one transducer device. Preferably, the invention also includes receiving a measurement taken from the at least one transducer; and transmitting the measurement to the control device. Preferably, the invention also includes receiving a request from the control point about a status of the at least one transducer device; converting a protocol of the request to a protocol of the at least one transducer device; and sending the converted request to the at least one transducer device.

Figure 1:
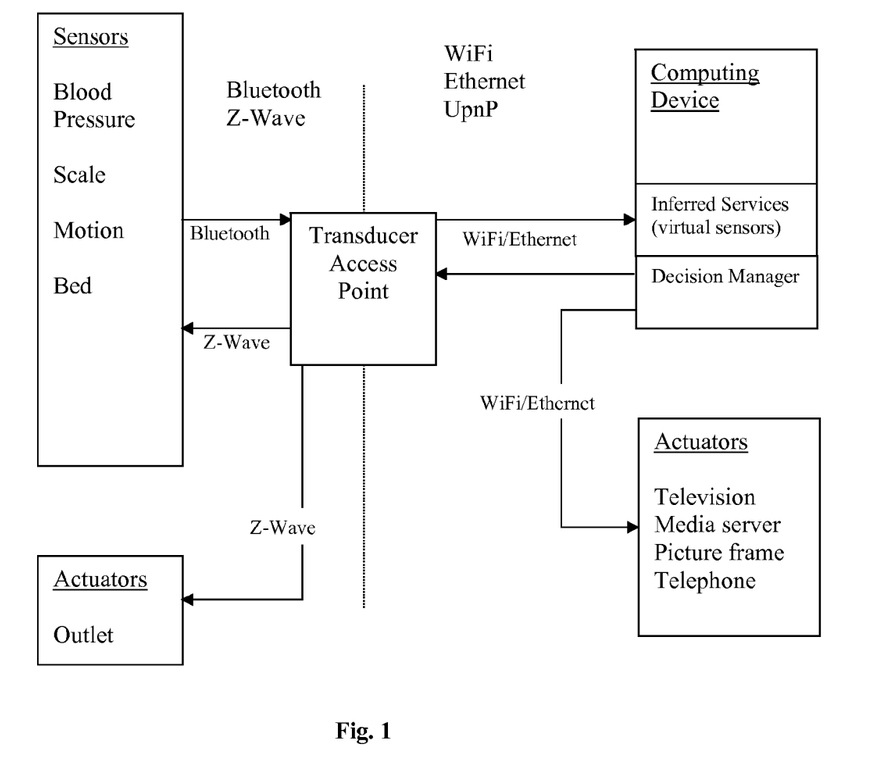
FIG. 1 illustrates a high-level platform architecture.

FIG. 1 illustrates high-level platform architecture. The "left-side" of the diagram is characterized by low-power, in some cases proprietary protocols, used by the sensors and actuators to handle communications. The "right-side" of the diagram represents the Digital Home, where WiFi, Ethernet, and UPnP are the communication technologies of choice. The "Healthy Digital Home" is enabled (in part) by the Transducer Access Point (TAP), which bridges the various sensor/actuator networks (specifically Bluetooth and Z-Wave in this case), to WiFi/Ethernet, and exposes the various physical devices "on the left" as UPnP devices "on the right" such that intelligent control points can perform actions, request state, and subscribe to event notifications.

UPnP is an architecture for pervasive peer-to-peer network connectivity of intelligent appliances, wireless devices, and PCs. It is designed to bring easy-to-use, flexible, standards-based connectivity to ad-hoc or unmanaged networks whether in the home, in a small business, public spaces, or attached to the Internet. UPnP is a distributed, open networking architecture that leverages TCP/IP and the Web technologies to enable seamless proximity networking in addition to control and data transfer among networked devices in the home, office, and public spaces.

UPnP is more than just a simple extension of the plug and play peripheral model. It is designed to support zero-configuration, "invisible" networking, and automatic discovery for a breadth of device categories from a wide range of vendors. This means a device can dynamically join a network, obtain an IP address, convey its capabilities, and learn about the presence and capabilities of other devices.

Protocols supported by the TAP include, for example, Bluetooth and Z-Wave. Obviously, any protocol may be used as would be appreciated by the skilled artisan. The protocols tend to be flexible, extensible building blocks that allows radio protocols such as these to communicate with other devices inside and outside the home.

Figure 2:
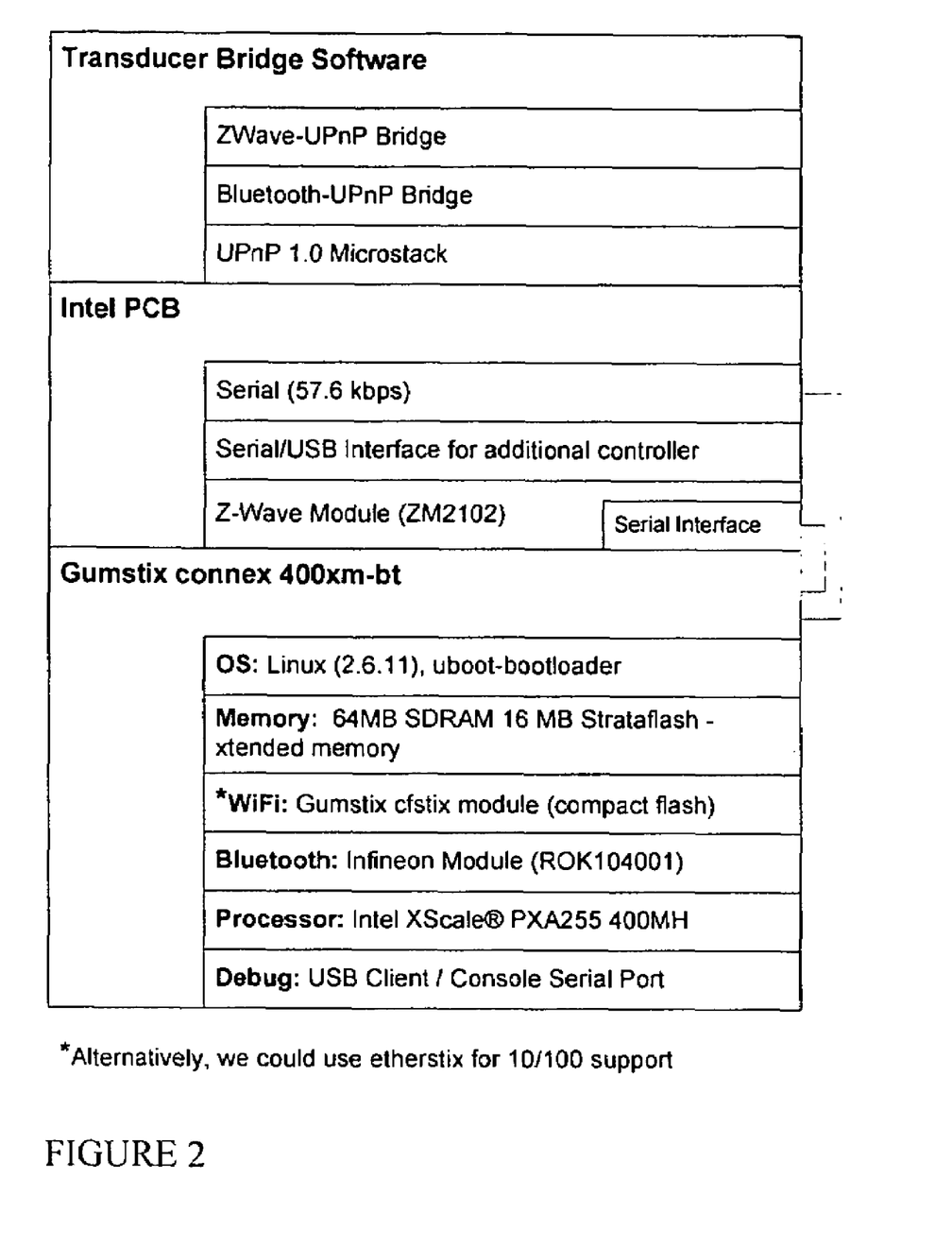
FIG. 2 illustrates an exemplary Transducer Access Point architecture.

The following sensors and actuators are examples of devices that may be integrated into the platform: Scales, Blood Pressure Monitors, Pressure Sensors, Presence Sensors, Multi-Level Light, Television, Personal Computers, Bathroom Mirror Displays, Picture Frame Displays, Cell Phones, PDAs, etc. Again, this list of devices is exemplary and not exclusive. Due to limitations exhibited by typical wireless sensors (e.g. power profile, transmission range, memory capacity, cost, etc.) a TAP is used to allow communication to take place, as described above. FIG. 2 illustrates an exemplary TAP Architecture. The TAP is intended to serve as a proxy for the low-powered (Bluetooth and Z-Wave) transducers.

An Inference Engine is the computational entity responsible for computing and understanding the data collected from the home sensor network. Essentially, sensor data is collected, and compared against a probabilistic model in order to determine the events that the data represents. Based on the recognized events, the decision manager may initiate local and/or remote actuation. For example; the probabilistic model may determine, based on data collected from multiple sensors (e.g., bed pressure sensor, motion sensors, bedroom door contact switch, etc.) that the occupant is in bed.

Figure 3:
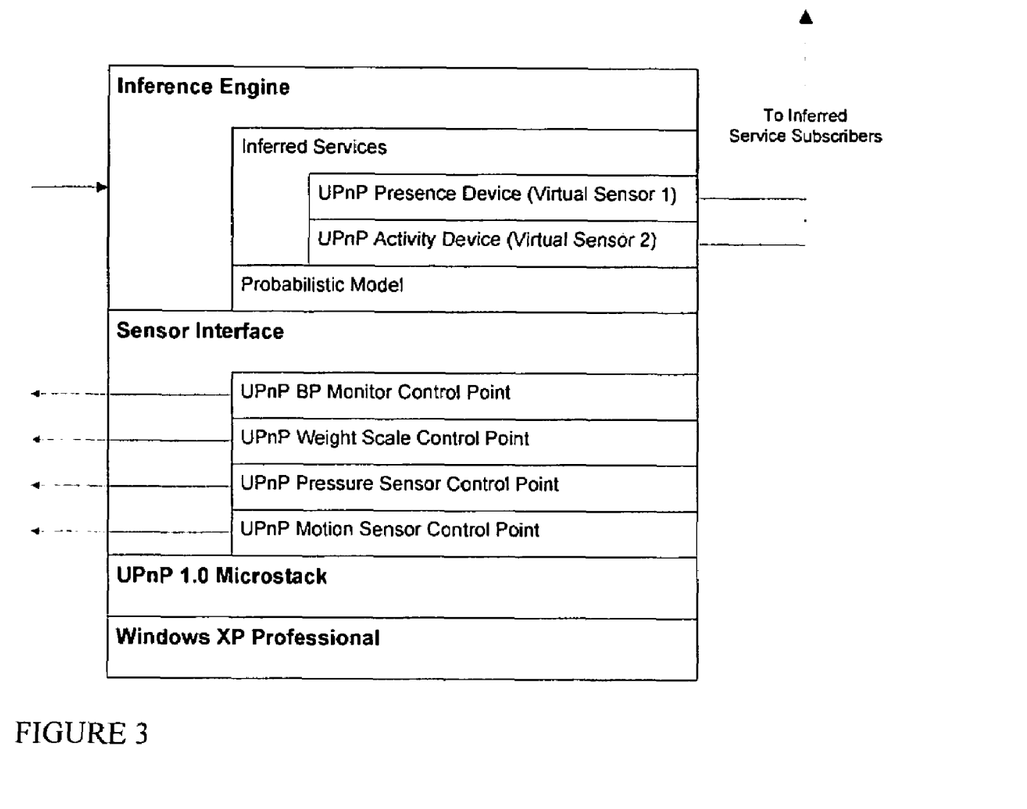
FIG. 3 illustrates the inferred services architecture of the system.

In FIG. 3, a Sensor Interface is the block responsible for communicating with devices exposed by the TAP. This "raw" sensor data is collected and interpreted by the inference engine. The external interface to the inference engine is referred to as Inferred Services. Inferred Services are exposed as devices and are indistinguishable from their physical counterparts on the home network. In this way, Inferred Services can be thought of as "virtual sensors" that leverage the processing power of a computing device to increase the accuracy associated with the data they are transmitting, as well as collating disparate information from various sensors to represent higher level events. For example: The Activity Device depicted in FIG. 3 may utilize data from a multitude of sensors (e.g., motion, light, contact switches, RFID, time of day, etc.) to determine that the home occupant is making breakfast. Interested control points may subscribe to the "making breakfast" event in the same manner they would use to communicate with a specific physical sensor device.

Figure 4:
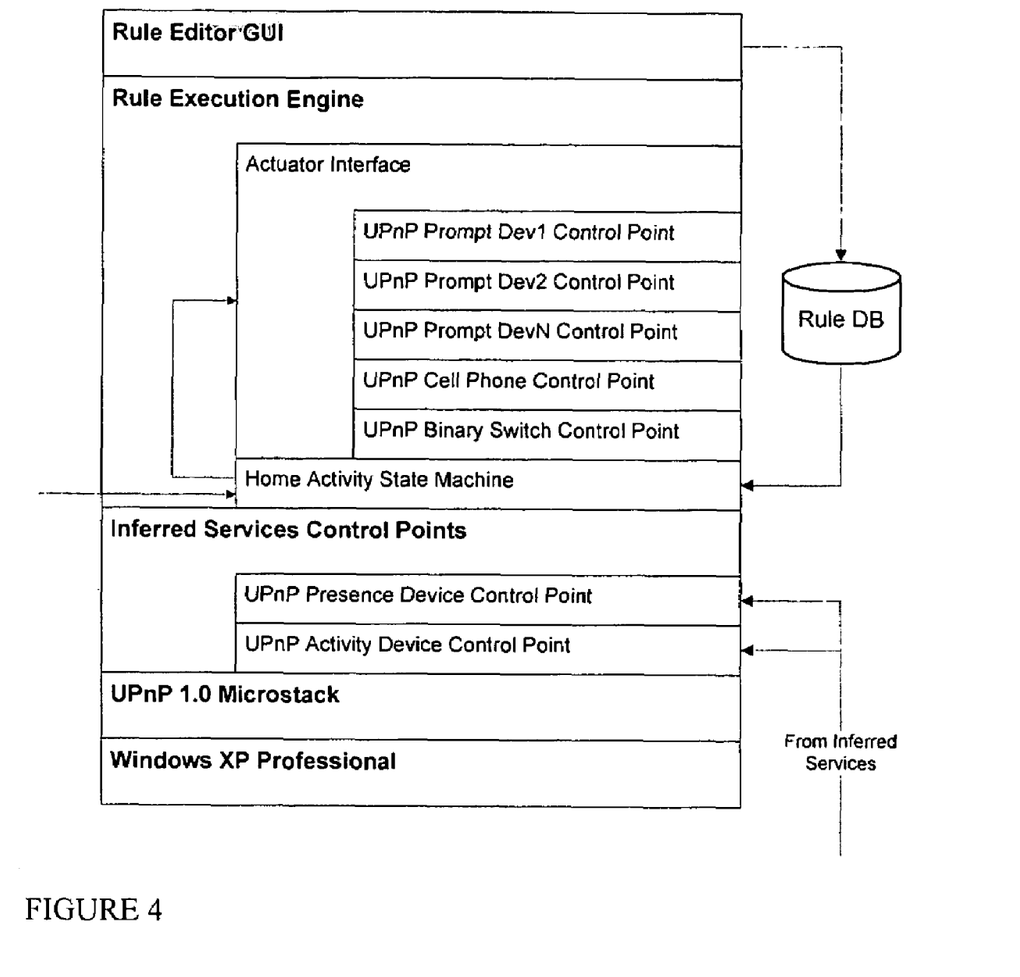
FIG. 4 illustrates the device manager architecture of the system.

A Decision Manager, illustrated in FIG. 4, is an example of a general control point that subscribes to the Inferred Services. Based on event notifications received from the Inferred Services, and rules defined by users of the system, actuation is initiated either inside or outside the home environment. The Inferred Services Control Points block is the interface into the Inferred Services. In this example, both the Inferred Services and Decision Manager reside in the same computing device, but this is not a requirement of the system (nor is having one distinct set of Inferred Services and one distinct Device Manager). One characteristic about the system is the following: If the underlying set of physical sensors change, while the events subscribed to may be more (or less) accurate, there is no need for the Decision Manager to change.

The information retrieved from Inferred Services in conjunction with user-defined rules will be used within the framework of the platform to construct a state machine representing the activities taking place in the home. The following is an example of the Decision Manager in action:

1. Remote family caregiver accesses rule editor via web interface;

2. RFC creates a rule that specifies the following: If primary occupant is in the bathroom for over 2 hours, send SMS message to my cell phone;

3. Occupant enters bathroom (detected by motion sensor and/or weight scale measurement); and 4. 2 hours elapse (an unusually long time for the home occupant to remain in the bathroom), state machine raises alert to Rule Execution Engine, and SMS message is sent via actuator interface alerting the remote caregiver of a possible fall.

For the purposes of this example, the following types of actuation will be supported by the Decision Manager's Actuator Interface:

Prompt, including text and color (to designate severity) overlaid on:

Television

Picture Frame

Bathroom Mirror Display (in addition to 'text', the bathroom mirror will have a more sophisticated display combining the most recent weight scale measurement and a graphical depiction of measurement history).

Cell Phone (SMS message)

(Z-Wave) Light switch on/off (to show communication backchannel through the TAP).

It is readily understood that the above-mentioned types of actuation is not limiting, but rather exemplary.

Figure 5:
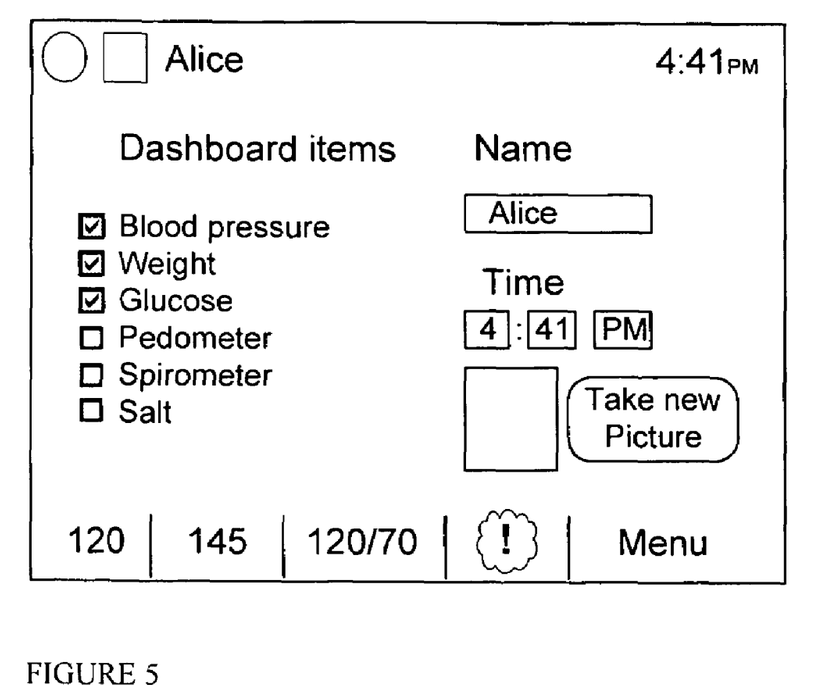
FIG. 5 illustrates an exemplary display setting for a graphical user interface.
Figure 6:
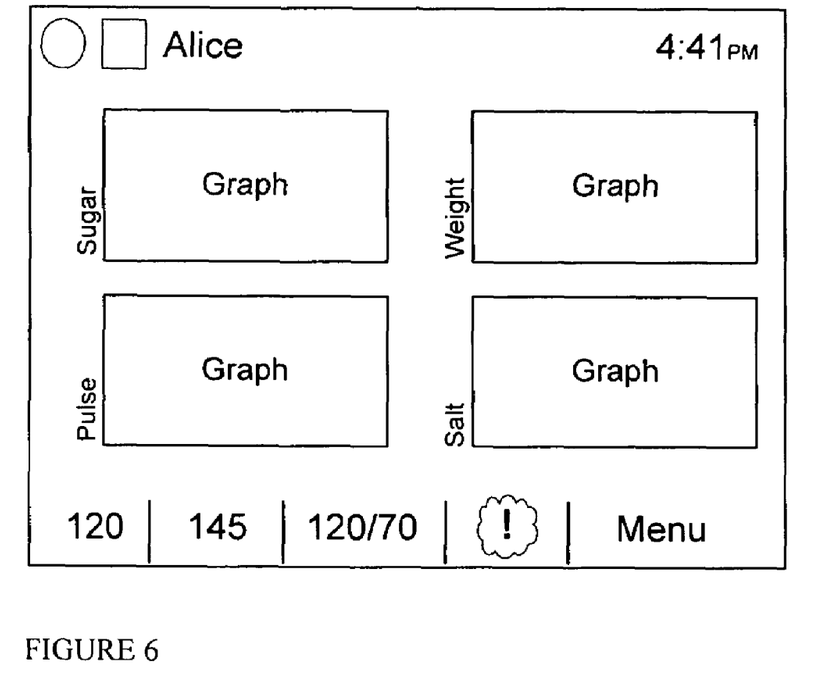
FIG. 6 illustrates an exemplary history for a graphical user interface.

FIGS. 5 and 6 are exemplary user interfaces. FIG. 5, for example, illustrates a display setting for a graphical user interface, while FIG. 6 illustrates the history of a graphical user interface.

This invention relates more specifically to a method an apparatus for exposing (bridging) data and services offered by low-power, low duty cycle transducers (sensors and actuators) in a standardized format over existing and established home networking technologies. This "Transducer Access Point" (TAP) is a functional component that serves as a proxy for devices and sensors that are off/asleep the majority of the time to conserve power (e.g. battery life). The TAP may be implemented as a stand alone device or embedded within a computing device such as a home PC.

Example Usage Scenario:

John purchases a battery-powered weight scale with an integrated Bluetooth radio.

John purchases a Bluetooth-enabled Transducer Access Point (Transducer AP).

John plugs the Transducer AP into the wall, and pairs it with the weight scale (for example, using existing or emerging Bluetooth pairing technology).

The Transducer AP, which is always powered-on, represents the scale as a device (in a standardized format) to the home network via established home networking technologies; Ethernet, WiFi, IP, UPnP, etc.

The Transducer AP solves at least the following problems:
Range; many popular/emerging sensor technologies are based on low-power, short range networks (Bluetooth, ZigBee/802.15.4, ZWave. The Transducer AP bridges devices on low-power networks to networks with "whole-house" range; Ethernet, WiFi.

Low (battery power) device characteristics; emerging technologies that enable device discovery and control (e.g. UPnP) require devices to broadcast their capabilities on a frequent basis. This is not possible for devices that are "off" 99% of the time. The Transducer AP serves as a proxy for the sensors and assumes this responsibility on the behalf of the physical device (e.g. weight scale).

Interoperability; the Transducer AP provides the opportunity to represent health devices & sensors in a standardized format (e.g. IP/UPnP) enabling an interoperable ecosystem of devices/sensors and compute platforms (PC, personal health system, cell phones, etc.) utilizing tried and true networking technologies.

Software running on John's PC and cell phone can discover, control, and subscribe to events generated by proprietary health devices & sensors via the Tranducer AP.

John takes a weight measurement in the morning.

Later in the day, when John boots his PC or turns on his cell phone, the devices discover the weight scale on the network (exposed by the Transducer AP) and query for the most recent weight measurement; information exposed by the Transducer AP even though the scale is currently off.

Potentially, John has a number of health devices and sensors utilizing various PAN technologies that are represented by the Transducer AP to the home network in a standardized format.

Figure 7:
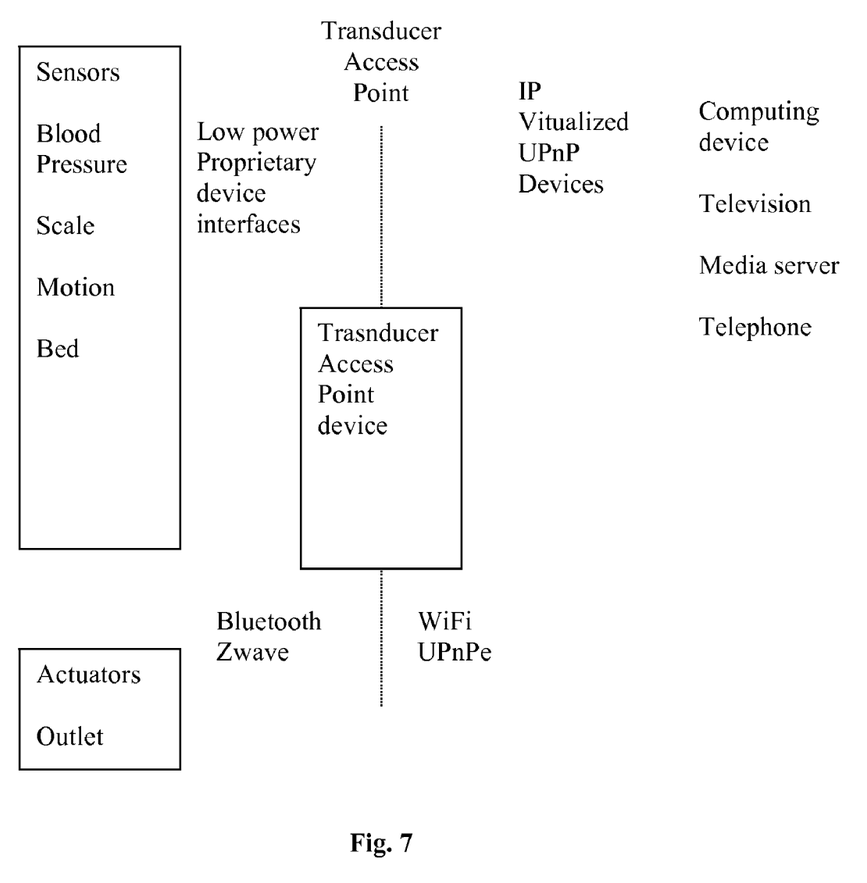
FIG. 7 illustrates an exemplary transducer access point network in accordance with the invention.

FIG. 7 shows the transducer access point framework. The devices on the right include transducer devices that intend to be discoverable and controllable by control points on the local area networks and intend to be able to send useful information to control points. The TAP serves as a functional block wherein transducer devices are represented as virtual devices in the local area network.

FIG. 7 also shows control points exist on the local area network. These control points serve as a point of control for all devices in the network. For example, they may serve as a point of control for TVs, Media Servers, printers, Wi-Fi access points, gateways (Other devices in the network block). Some control points may also include intelligent control points which perhaps could infer the state based on input from several transducer devices in the network.

Figure 8:
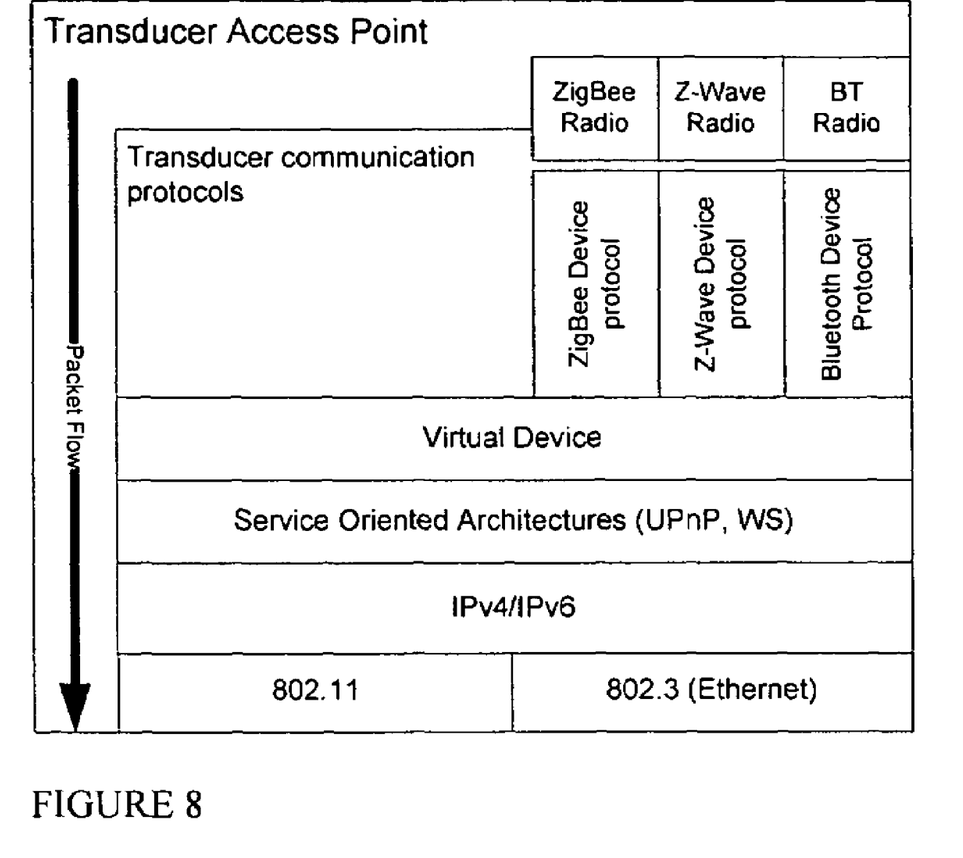
FIG. 8 illustrates an exemplary functional transducer access point in accordance with the invention.

FIG. 8, shows a functional TAP block. As a transducer access point, it bridges the appropriate transducer protocol and the device manager recognizes the transducer device and creates a virtual device that exposes services based on the underlying service oriented architectures such as UPnP, WS.

Figure 9:
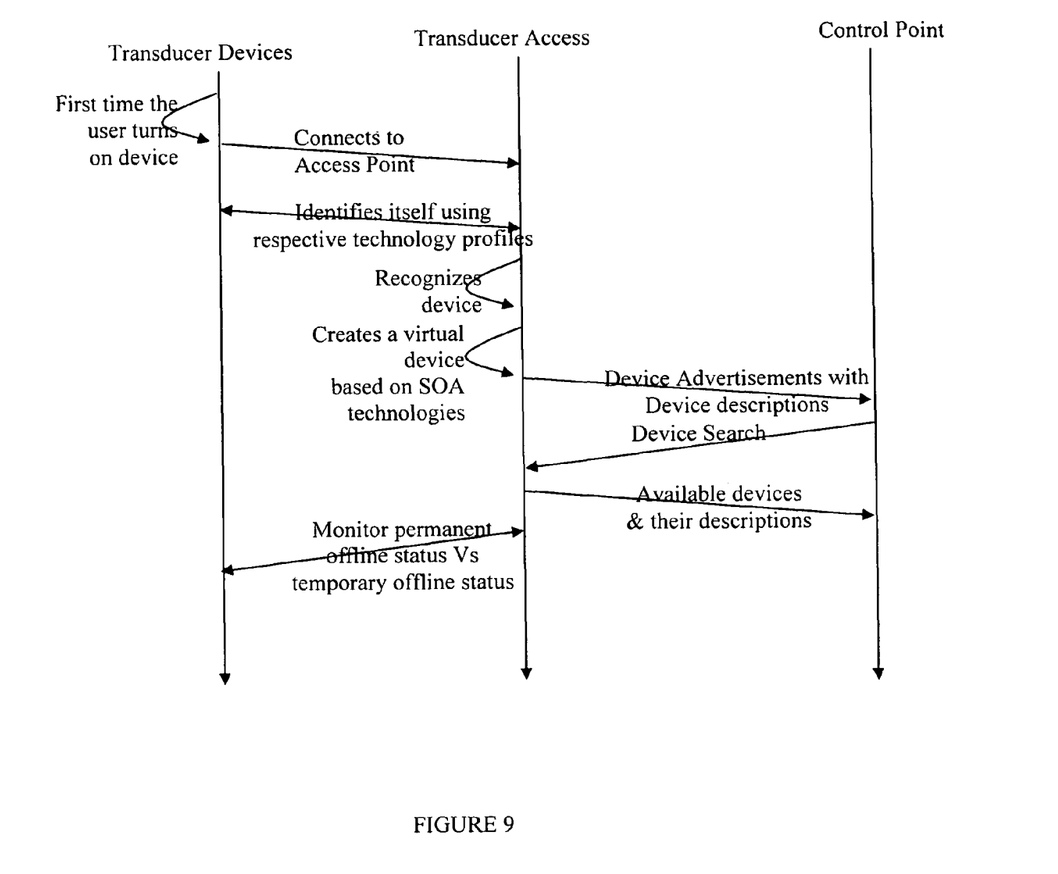
FIG. 9 illustrates an exemplary flow diagram of initial bootstrapping of the transducer device into a local network.

FIG. 9 illustrates the initial bootstrapping of the transducer device into the local network and describing its capabilities. Initially, when the user turns on the transducer device, the transducer access point identifies the device and creates a "virtual device" for it. It then sends out device advertisements. As far as the control point is concerned, this process is transparent. The control point sees the device as though the device is on the same network. The transducer access point responds to searches for the devices. The transducer access point also maintains the state of the device and the status of the transducer devices (asleep or permanently removed from the network). In order to maintain device status, the transducer device could use, for example, underlying transport technologies or use application level watchdog timers.

Figure 10:
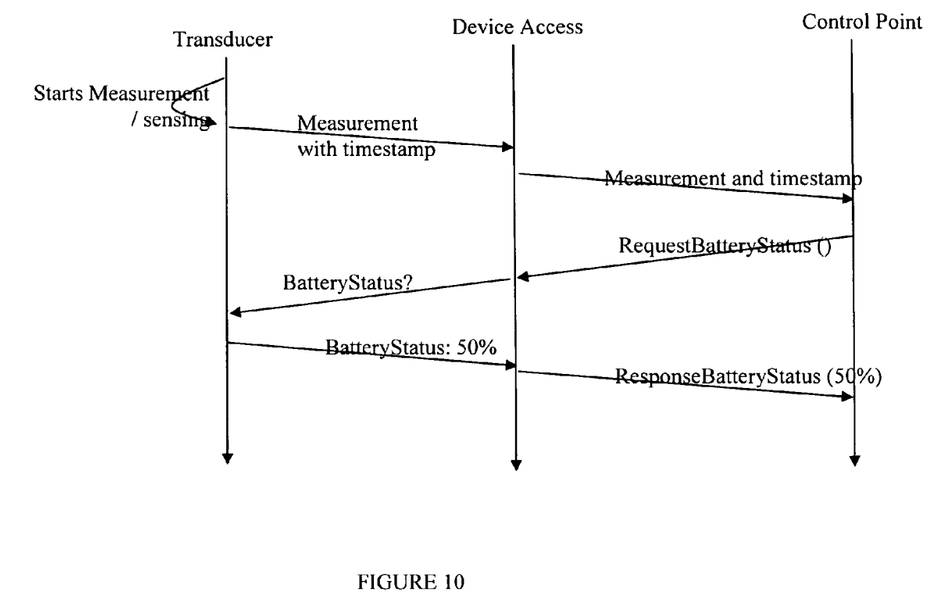
FIG. 10 illustrates an exemplary flow diagram of device control and eventing between control devices and transducer devices.

FIG. 10 illustrates some examples of how device control and eventing can occur between control points and transducer devices. In a typical case, a device wakes up once in a while and performs some sort of sensing/measurement. It transmits the taken measurement to a device access point and goes back to sleep. The device access point could then transmit this information to multiple control points in the network.

In an alternate scenario, the control point may request for the transducer device's battery status. The TAP converts the control protocol to the respective protocol that the transducer speaks (Zigbee, BT, etc) and forwards the message. The battery status returned from the transducer device gets converted to the appropriate protocol that the control point speaks and is returned.

Currently, most devices and sensors that have the ability to connect to the home network, do so through a myriad of dongles, fobs, cables, and many other proprietary connectors to the PC, with proprietary software running on the PC for each device required to interpret the data. This is problematic not only from a consumer experience standpoint, but also for a number of reasons described in above.

The Transducer AP (or transducer access device) will enable an interoperable ecosystem of devices/sensors and compute platforms in the home; allowing networked devices/computers to communicate with and obtain data from low-power, low duty cycle sensors and actuators that use a variety of low-power networking technologies.

The Transducer AP exposes the sensors/actuators as UPnP (although this invention is not limited to UPnP) devices to the home network (e.g. UPnP weight scale device, television prompt device, cell phone prompt device, etc.

The Computing Device (e.g. personal computer) has software that:

Subscribes to receive event notifications from the devices exposed by the TAP (e.g. weight event, motion event, door open/close event, etc.).

Uses these events to determine what activities are taking place in the home (e.g. the inference engine). For example, if the pressure sensor in the bed generates an "out of bed" event, the motion sensor in the bathroom is triggered, and a weight event is generated, there is a high probability that the user is in the bathroom (as opposed to the cat triggering a motion sensor, inducing a false positive).

Based on activities taking place in the home (i.e. state of the home), determines appropriate actions to initiate (e.g. the decision manager). For example, if the inference engine/home state machine determines that the user is in the bathroom and has been there for four (4) hours indicating a possible fall, the decision manager could use the remote prompting infrastructure to generate a prompt on the remote caregiver's cell phone.

It is readily understood by the skilled artisan that the embodiments disclosed herein are merely exemplary and are not intended to limit the scope of the invention.

The invention claimed is:

1. A network for bridging data and services, comprising:
a plurality of transducer devices accessible via the network through a first network protocol;
a transducer access device configured with a plurality of technology protocols to discover the plurality of transducer devices, and associate a virtual transducer device for each of the plurality of transducer devices discovered, wherein the transducer access device is configured to communicate with the plurality of transducers devices through the first network protocol; and
a plurality of control devices configured to control the plurality of transducer devices via the transducer access device, wherein the plurality of control devices are configured to communicate with the transducer access device and control the plurality of transducers devices through a second network protocol that is different than the first network protocol, wherein the plurality of control devices are configured to subscribe to receive event notifications from the transducer device discovered by the transducer access device, determine activities occurring on the network as a result of an event on the transducer device, and initiate an action based on the determined activities,
wherein the activities occurring on the network include an emergency related to an individual as determined by the plurality of transducer devices, the transducer access device, or both.

2. The network according to claim 1, wherein the plurality of transducer devices are selected from the group consisting of: a Bluetooth device, a device operating using a Zigee protocol, a WiFi device and a Z-Wave device.

3. The network according to claim 1, wherein the transducer access device is part of a computing device.

4. The network according to claim 1, wherein the plurality of transducer devices are selected from the group consisting of: a blood pressure monitor, a scale, a sensor and a bed.

5. The network according to claim 1, wherein the plurality of control devices are selected from the group consisting of: a personal computer, a television, a mobile device and a mirror.

6. The network according to claim 1, wherein the transducer access device is configured to send out advertisements, respond to searches by the plurality of control devices and maintain a state of the plurality of transducer devices.

7. The network according to claim 1, wherein the transducer access device comprises an inference engine.

8. The network of claim 1, further comprising discovering the plurality of transducer devices and determining an inference based on data from the plurality of transducer devices.

9. The network of claim 1, wherein the action includes transmitting a message to an emergency service center, the plurality of control devices, or both.

10. The network of claim 1, wherein the transducer access device serves as a functional block wherein the virtual transducer device is located in the network.

11. A device comprising a transducer access device configured to communicate with a plurality of transducer devices accessible via a network through a first network protocol and configured to communicate a plurality of control devices configured to control the plurality of transducer devices via the transducer access device, wherein the plurality of control devices are configured to communicate with the transducer access device and control the plurality of transducers devices through a second network protocol that is different than the first network protocol, and
wherein the transducer access device is configured with a plurality of technology protocols to discover the plurality of transducer devices, and associate a virtual transducer device for each of the plurality of transducer devices discovered, wherein the transducer access device is configured to communicate with the plurality of transducers devices through the first network protocol,
wherein the plurality of control devices are configured to subscribe to receive event notifications from the transducer device discovered by the transducer access device, determine activities occurring on the network as a result of an event on the transducer device, and initiate an action based on the determined activities,
wherein the activities occurring on the network include an emergency related to an individual as determined by the plurality of transducer devices, the transducer access device, or both.

12. The device of claim 11, wherein the plurality of transducer devices are selected from the group consisting of: a Bluetooth device, a device operating using a Zigee protocol, a WiFi device and a Z-Wave device.

13. The device of claim 11, wherein the transducer access device is part of a computing device.

14. The device of claim 11, wherein the plurality of transducer devices are selected from the group consisting of: a blood pressure monitor, a scale, a sensor and a bed.

15. The device of claim 11, wherein the device further comprises a plurality of virtual transducer devices associated with each of the plurality of transducer devices.

16. The device of claim 15, wherein plurality of virtual transducer devices communicate with a plurality of control devices in a network.

17. The device of claim 16, wherein the plurality of control devices are selected from the group consisting of: a personal computer, a television, a mobile device and a mirror.

18. The network according to claim 4, wherein the sensor is selected from the group consisting of: a light level sensor, a pressure sensor and a presence sensor.

19. The device of claim 14, wherein the sensor is selected from the group consisting of: a light level sensor, a pressure sensor and a presence sensor.

* * * * *